United States Patent [19]

Swearingen, Jr.

[11] 4,419,053
[45] Dec. 6, 1983

[54] PROPELLER SPINNER

[75] Inventor: Edward J. Swearingen, Jr., San Antonio, Tex.

[73] Assignee: Fairchild Swearingen Corporation, San Antonio, Tex.

[21] Appl. No.: 323,178

[22] Filed: Nov. 20, 1981

[51] Int. Cl.³ ............................................. B64C 11/14
[52] U.S. Cl. .................................. 416/234; 416/239; 416/245 R
[58] Field of Search ............... 416/245 R, 244 R, 239, 416/234

[56] References Cited

U.S. PATENT DOCUMENTS

| | | | |
|---|---|---|---|
| 2,289,400 | 7/1942 | Woods | 416/245 R X |
| 2,408,677 | 10/1946 | Owner | 416/245 R X |
| 2,592,214 | 4/1952 | Wallace | 416/239 X |
| 2,614,638 | 10/1952 | Beaupre | 416/245 R |
| 2,934,150 | 4/1960 | Fink | 416/245 R X |

FOREIGN PATENT DOCUMENTS 532127 1/1941 United Kingdom ............ 416/245 R

Primary Examiner—John W. Shepperd
Assistant Examiner—Joseph M. Pitko
Attorney, Agent, or Firm—Michael W. York

[57] ABSTRACT

Propeller apparatus including a propeller spinner with a plurality of spaced protruding surfaces extending radially outward from the exterior surface of the spinner and a plurality of variable pitch propeller blades extending radially outward from the spinner through the protruding surfaces of the spinner. Each propeller blade has an inner or root end portion located adjacent to the protruding surface of the spinner and the root end portion has a propeller cuff attached to it or alternatively the root end portion can have an airfoil section. Each protruding surface has a portion thereof which is substantially spherical shaped and the adjacently located root end portion has a propeller cuff or the airfoil section with an inner surface which is curved to substantially match the spherical shaped surface and as a consequence any substantially gap is eliminated between the substantially spherical shaped surface and the adjacently located curved inner surface when the propeller blade is varied through at least a portion of its forward operationally pitch range. This lack of any substantial gap reduces or eliminates drag and hence improves the efficiency of the propeller apparatus.

7 Claims, 3 Drawing Figures

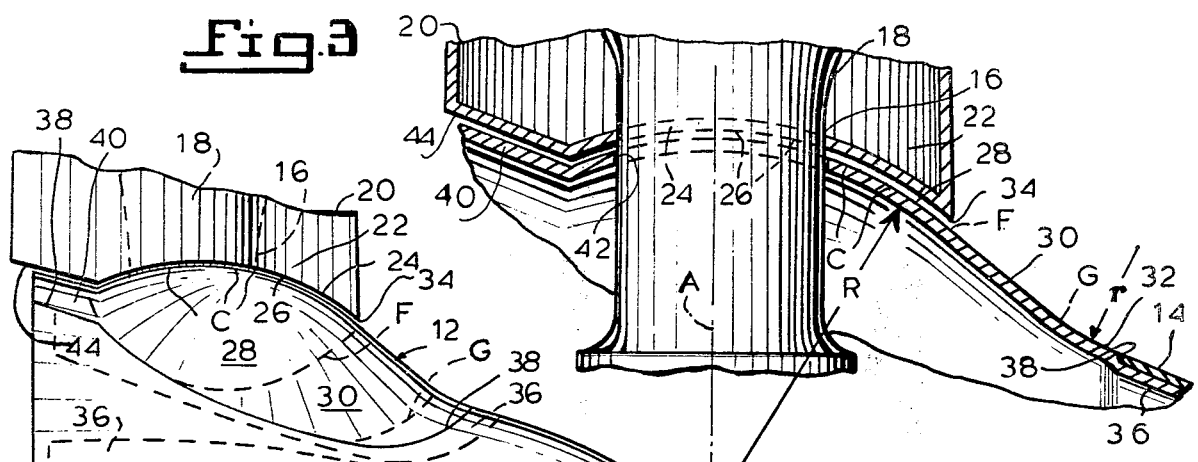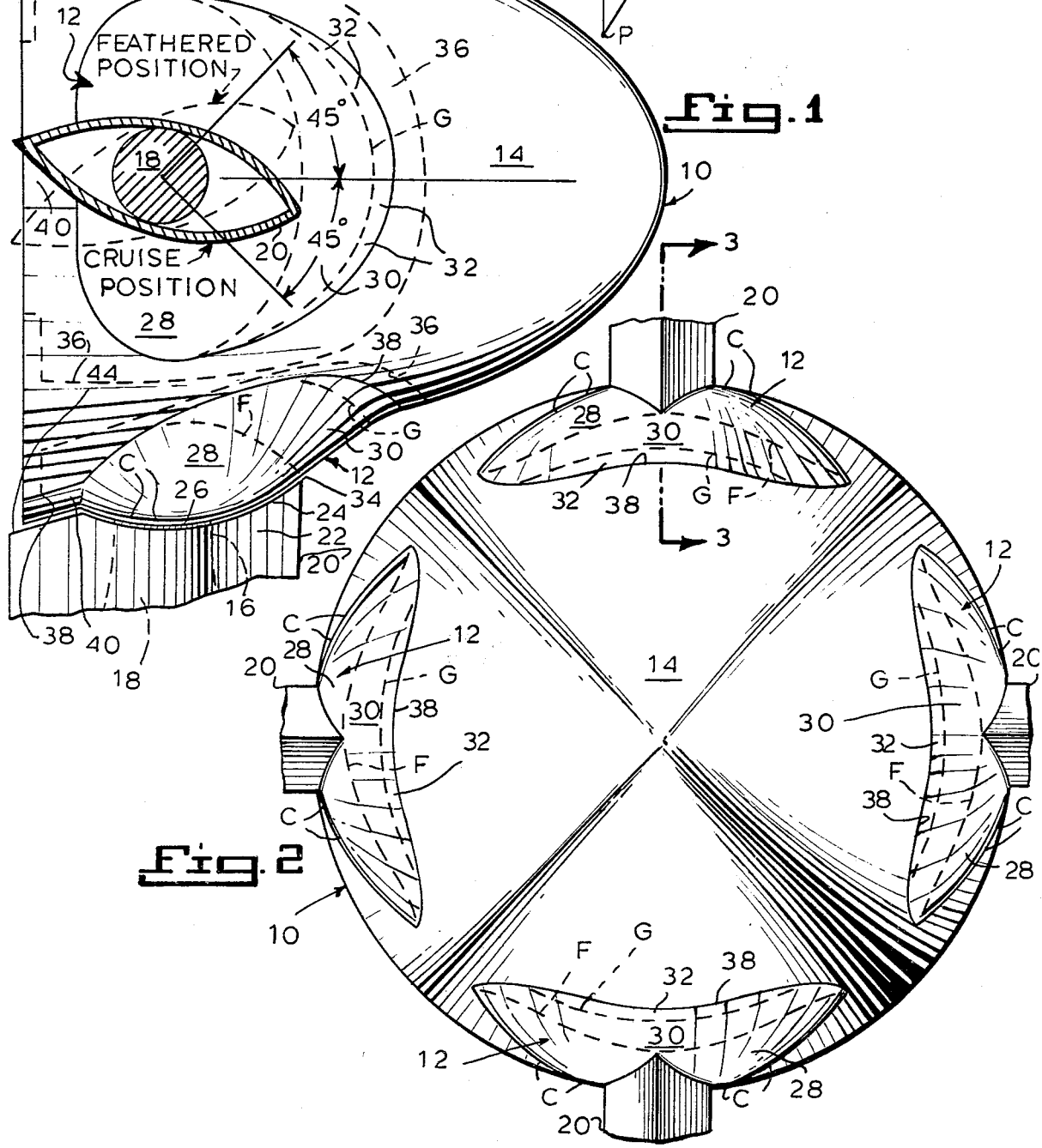

PROPELLER SPINNER

BACKGROUND OF THE INVENTION

Propellers for aircraft and the like generally are designed in a manner such that only their outer portion contributes effectively to their intended use, which is usually for assisting in propelling aircraft and the like. In this connection, commonly only the outer portion of a propeller blade has an airfoil that is designed to contribute to the effective use of the propeller, whereas the inner portion of the propeller blade has a cross-section which contributes little to anything to the thrust resulting from the turning of the propeller. In the past the use of a propeller that had blades with an inboard portion of the blade that contributed little to the thrust of the propeller was unimportant since in many cases the engine adjacent to the propeller had a large frontal area and hence the effectiveness of the inner portion of the propeller blade was destroyed by this large frontal area anyway. However, with modern aircraft and modern engines, there is no such large frontal area which destroys the effectiveness of at least a portion of the inner portion of the propeller blade.

Not only does the common construction of a propeller blade prevent the inner portion of the propeller blade from being utilized for effective thrust, but also the design of the propeller blade can contribute significantly to drag which can absorb torque from the engine that is attached to the propeller. This drag occurs because the cross-section of the inner portion of the propeller blade does not have an effective air foil. Instead the common cross-section for the interior portion of a propeller blade would be generally oblong shaped or even circular shaped. Such a shape results in separation of the air flow from the propeller and results in undesirable drag. In addition, this drag increases with increased speed and hence is even more pronounced in modern high performance aircraft.

These undesirable effects of the common aircraft propeller blade and the like have been known for some years and some measures have been taken in the past to attempt to overcome these disadvantages. One method that has been utilized in the past has involved the use of what is termed a propeller cuff that can be located around and connected to the inner portion of a propeller blade. This propeller cuff is designed to give the exterior of the inner portion of the propeller blade an appropriate airfoil cross-section so that the blade with the propeller cuff will give thrust not only from its outer portion but also from the inner portion which has the connected propeller cuff. Such a propeller cuff is set forth in U.S. Pat. No. 2,289,400.

Although propeller cuffs have been used in the past, their use has been limited. Commonly, modern propellers have blades whose pitch is variable so that the pitch can be varied depending upon the desired flight conditions. Unfortunately, a propeller blade which has a cuff will generally result in drag occurring as a result of the junction between the outer surface of the propeller spinner and the adjacent inner surface of the propeller cuff. Usually there is a significant gap at this juncture and this results in air turbulence and associated drag. Various attempts have been made in the past to reduce this gap to minimize the turbulence and associated drag; however, with modern variable pitch propellers, it has not been possible to achieve a minimum gap over a wide range of blade positions. In one instance the inner end portion of the cuff was designed so that it presented a minimum clearance when the propeller blade and associated cuff was in its normal cruise position; however, this did not result in the elimination of drag when the propeller was rotated to its other positions.

Various attempts have been made to solve the problems associated with the use of propeller cuffs in connection with variable pitch propellers. Some of these attempts are set forth in U.S. Pat. Nos. 2,289,400 and 2,408,677. However, in these arrangements the range of the pitch of the blade is limited without incurring appreciable drag between the inner edge of the cuff and the outer surface of the propeller spinner, and in one instance an indentation in the propeller spinner is employed which would be impractical to use with modern day spinners. Insofar as the arrangement in U.S. Pat. No. 2,289,400 is concerned, it is clear that the range of pitch of the propeller must be limited in view of the construction of the propeller fairing. Insofar as the embodiments of the structure set forth in U.S. Pat. No. 2,408,677 are concerned, it is clear that the embodiments set forth in FIGS. 1 and 2 would require the range of the pitch of the blade to be restricted in order that a significant gap would not exist between the lower portion of the cuff and the associated projection on the propeller spinner. In addition, the outer flat shape of the projection departs significantly from the adjacent shape of the spinner and hence can create undesirable turbulence. The other embodiment illustrated in FIG. 3 of this patent is more desirable in that it eliminates this outer flat surface and instead substitutes a depression into the spinner itself. However, such a construction of the propeller spinner is impractical and may also limit the range of the variable pitch of the associated propeller blade.

In the past, the deficiencies associated with prior attempts to reduce drag on variable pitch propellers with cuffs and the like have not been deemed to be that significant since the associated drag could be overcome by supplying additional engine power. However, at the present time with the high cost associated with aircraft fuels and the like, even minor reductions in drag can result in significant cost savings over an extended period of time. Not only would a reduction in drag between the spinner and the associated propeller cuff reduce the amount of fuel that had to be consumed for a given flight and hence result in a cost savings, but it also might enable the aircraft to carry less fuel and hence less weight for a given flight or increase its range. Consequently, it is now extremely important that any unnecessary drag between a propeller spinner and the associated propeller cuff be eliminated insofar as it is practical and does not interfere with the proper operation of the variable pitch propeller.

The present invention overcomes these problems associated with the drag that occurs between a propeller spinner and the adjacent edges of a propeller cuff on a variable pitch propeller and provides propeller apparatus in which a variable pitch propeller and associated propeller cuffs are movable through a wide range of propeller pitches with the inner portion of the propeller cuff maintaining a uniform narrow gap with the adjacent exterior portion of the propeller spinner. Moreover, this invention does not require that there be any unusual indentations or the like in the propeller spinner itself.

SUMMARY OF THE INVENTION

This invention relates to variable pitch propeller apparatus, which includes a propeller spinner and associated propeller cuffs or the like.

Accordingly, it is a primary object of the present invention to provide a propeller spinner and associated propeller cuffs or the like which reduce drag.

It is also a primary object of the present invention to provide a propeller spinner and associated propeller cuffs or the like which result in conservation of energy.

It is also a primary object of the present invention to provide a propeller spinner and associated propeller cuffs or the like which reduce associated fuel consumption of the vehicle, such as an aircraft, to which the propeller is attached.

It is another object of the present invention to provide a propeller spinner and associated propeller cuffs which reduce drag but allow the pitch of the propellers to be varied over a wide range.

It is another object of the present invention to provide a propeller spinner and associated propeller cuffs or the like which do not interfere significantly with the aerodynamic shape of the propeller spinner.

It is a further object of the present invention to provide a propeller spinner and associated propeller cuffs or the like which do not require extensive modification of the propeller spinner.

It is also an object of the present invention to provide a propeller spinner and associated propeller cuffs or the like which do not require indentations in the propeller spinner.

The present invention provides propeller apparatus, including a spinner having a plurality of spaced protruding surfaces extending radially outward from the exterior surface of the spinner and a plurality of variable pitch propeller blades extending radially outward from the propeller spinner through the protruding surfaces of the spinner. The propeller blades have a root end portion located adjacent to the protruding surfaces of the spinner and the root end portion includes a propeller cuff or a blade portion with an air foil section. Means are located on the root end portion adjacent to the protruding surface of the spinner and on the protruding surface of the spinner for reducing drag between the root end portion and the protruding surface of the spinner while the pitch of the variable pitch propeller blades is varied through at least a portion of the forward operational pitch range of the propeller blades.

BRIEF DESCRIPTION OF THE DRAWINGS

The invention will be hereinafter more fully described with reference to the accompanying drawings in which:

FIG. 1 is a side elevational view of a propeller spinner and associated propeller blades and cuffs incorporating the propeller apparatus of the present invention;

FIG. 2 is front elevational view of the apparatus illustrated in FIG. 1; and

FIG. 3 is an enlarged sectional view of a portion of the apparatus illustrated in FIG. 2 taken on the line 3—3 thereof.

DETAILED DESCRIPTION OF THE PREFERRED EMBODIMENT

Referring first to FIGS. 1 and 2, an aircraft propeller spinner is illustrated and designated generally by the number 10. It will be noted that a plurality of substantially equally spaced protrusions 12 extend outward from the exterior surface 14 of the spinner 10. These protrusions 12 are substantially identically shaped and are located on the exterior surface 14 of the spinner 10 substantially where the inner end or root end portion 16 of the propeller blades 18 pass radially outward through the surface 14 of the spinner 10.

Substantially identical propeller cuffs 20 are located around the inner or root ends 16 of the propeller blades 18 and are attached to the blade 18 in a manner well known in the art. As best illustrated in FIG. 1 the propeller cuffs 20 have an aerodynamic surface which permits the non-aerodynamic shaped inner end portion 16 of the propeller blades 18 to generate thrust due to the attached cuffs 20. It should be noted, as illustrated in FIG. 1, that the inner portion 22 of each cuff 20 has a root end portion 24 with at least a portion thereof which has a curved inner end surface 26 which is curved to match the curvature C of the adjacent portion 28 of the protrusion 12. The curved adjacent portion 28 of the projection or protrusion 12 with the curvature C and the substantially matching curved inner end surface 26 on the root end portion 24 of the propeller cuff 20 comprise means for reducing the drag between the root end portion and the protruding surfaces 12 of the spinner 10 while the pitch of the variable pitch propellers blades 18 is varied through at least a portion of the forward operational pitch range of the propeller blades 18.

The portion 28 of the protrusions 12 have a spherical shaped outer surface and as best illustrated in FIG. 3 the spherical surface has a radius R which pivots about a point P which is located on the centerline of central long axis A of the propeller blade 18. The spherical forward portion terminates at the juncture illustrated by the dashed line F where it intersects a forward sloping portion 30. The lower edge of the forward sloping portion in turn terminates at the junction represented by the dashed line G and from the line G there is a radiused portion 32, which as indicated in FIG. 3 has a radius r. As illustrated in FIG. 1 the same radius r is maintained for substantially 45° on each side of the centerline of the protrusion 12 when the vertex or point of the 45° angle is located substantially on the centerline of the long axis of the propeller blade 18.

As best illustrated in FIG. 3, the forward sloping portion 30 has a vertical cross section which slopes forward but is straight. The radiused portion 32 provides a smooth contour between the lower edge of the forward sloping portion 30 and the adjacent portion of the exterior surface 14 of the spinner 10. Conseguently, the radiused portion 32, the flat sloping forward portion 30 and the forward surface of the spherical portion 28 provide a generally smooth surface in conjunction with the adjacent exterior surface 14 of the propeller spinner 14 which reduces drag. The rear and other sides of the spherical portion 28 terminate at the adjacent surface 14 of the propeller spinner 10 or at a surface corresponding to the surface of the propeller spinner 10.

It is also important to note, as best illustrated in FIGS. 1 and 3, that the leading lower cuff 20 edge 34 does not extend forward of the juncture, represented by the line F, between the forward part of the spherical portion 28 and the adjacent forward sloping portion 30 and in addition that the forward portion of the curved surface 26 terminates substantially at the lower leading edge 34. In the preferred embodiment the leading lower edge 34 of the propeller cuff 20 terminates substantially at the juncture represented by the line F when the lower edge 34 of the propeller cuff is at its most forward position. This location of the leading lower edge 34 of the propeller cuff 20 with respect to the junction represented by the line F is important since if the leading lower edge 34 extended forward of the line F it would create a gap between the leading lower edge 34 and the adjacent surface of the forward sloping portion 30 which could result in undesirable drag. In a similar manner, it is important that the forward portion of the curved surface 26 not terminate before reaching the lower leading edge 34 of the propeller cuff 20 since this could create a gap between the lower leading edge 34 and the adjacent surface of the spherical portion 28 which could also result in undesirable drag.

In view of the previously described shape of the outer surface of the spherical portion 28 that has a portion thereof located adjacent to the exterior surface 14 of the propeller spinner 10 and the matching curved inner end surface 26 of the propeller cuff 20, coupled with the termination of the forward portion of the inner end surface 26 at substantially the lower leading edge 34 and the previously described location of the lower leading edge 34 with respect to the juncture represented by the line F, the propeller cuff 20 can be rotated to a significant degree without creating a substantial gap between the inner end surface 26 and the adjacent surface of the spherical portion 28 or creating any substantial gap between the lower leading edge 34 of the propeller cuff 20 and adjacently located surface of the spherical portion 28. In this connection, as illustrated in FIG. 3 the propeller cuff 20 can be rotated from its cruise position illustrated in solid lines to its feathered position illustrated in dashed lines without creating any such gaps which would result in drag when the spinner 10 and associated propeller blades 18 and cuffs 20 are in operation.

As best illustrated in FIGS. 1 and 3 each protrusion 12 is provided with a flange or skirt portion 36 whose upper surface generally coincides with the inner surface of the propeller spinner 10. The purpose of this skirt portion 36 is to provide means for attaching the protrusions 12 to the propeller spinner 10. In this connection, when the protrusions 12 are located in place extending through apertures 38 in the surface 14 of the propeller spinner 10, the skirt portion 36 can be suitably attached to the propeller spinner 10 by means known in the art such as by riveting or the like.

It should be noted that the aft end portion of the shirt portion 36 has a portion 40 which substantially corresponds to the contour of the outer surface 14 of the propeller spinner 10 since it actually forms part of this surface when it is in place. The protrusions 12 are also provided with a suitably located and shaped aperture 42 through which the inner or root ends 16 of the propeller blades 18 pass and in order to assist in installation the protrusion 12 and associated skirt portion 36 may be split or formed from two parts with a portion of the aperture 42 being in each part.

In view of the previously described construction of the propeller spinner 10 and the protrusions 12 with their associated skirt portions 36, the exterior surface of the spinner 10 is substantially continuous except for the protruding surfaces 12. Moreover, the exterior surface 14 of the propeller spinner 10 lacks any substantial depressions which were present in at least some of the prior art propeller spinners which were designed to attempt to reduce drag between the propeller spinner and associated variable pitch propeller cuff. Also, in view of this construction, the root end portion 24 of each propeller cuff 20 is located outside the exterior surface 14 of the propeller spinner 10.

The propeller apparatus of the present engine is manufactured and utilized in the following manner. The propeller spinner 10 is manufactured by means known to those skilled in the art so that it has a substantially continuous exterior surface 14 without any depressions. This propeller spinner 10 is manufactured with the appropriately sized and specified apertures 38 for receiving the protrusions 12. The protrusions 12, including end associated skirts or flanges 36 are also manufactured by similar means known to those skilled in the art to provide each protrusion with a portion 28. Each portion 28 has an outer surface which is curved in three dimensions which is substantially spherical shaped. Provision is also made in the spherical portion 28 for an aperture 42 for receiving the inner or root end 16 of the propeller blade 18. As previously indicated, the portion 12 and associated skirt portion 36 could be formed in two parts to facilitate the installation of the portion 12 and associated skirt portion 36 around the root end 16 of the propeller blade 18. The portion 12 and the associated skirt portion 36 is then suitably located so that the portion 12 projects outward from the aperture 38 in the surface 14 of the propeller spinner 10 and the skirt portion 36 is suitably connected to the propeller spinner 10 by riveting or the like. It should be noted that in general the portion 12 and the associated skirt portion 36 would be manufactured from the same material as the propeller spinner 10, which would normally be aluminum or some similar material.

Suitable propeller cuffs 20 also must be manufactured through means known in the art so that they have a root end portion 24 which has at least a portion thereof with a curved inner surface 36 whose curvature substantially matches the curvature of the outer surface of the spherical portion 28. These propeller cuffs 20 are then connected to the propeller blades 18 by means known to those skilled in the art. In view of the construction of the inner end portion 24 of the propeller cuff and the associated adjacently located spherical portion 28, the propeller blades 18 in its associated cuff 20 can be rotated so as to vary the pitch of the propeller blades 18 and the associated cuffs 20 through the full forward operational range of the propeller blades 18 without any substantial gap being created between the inner surfaces 26 of the root end portions 24 of the cuffs 20 and the adjacent surface of the spherical portions 28. Consequently, drag associated with such a substantial gap is reduced or eliminated. It will of course be understood that there must be some tolerance or minimal gap between the surface 26 and the adjacent exterior surface of the spherical portion 28 to provide for suitable tolerances to prevent bending between these surfaces. Consequently, the reference herein to gap or any substantial gap is not meant to include such a clearance as required by such tolerances.

It will be noted that when the propeller cuff 20 is rotated to some of its positions in the forward operational pitch range that the rear lower inner portion 44 of the cuff 20 will be located so that there is a substantial gap between its lower surface and the adjacent surface 14 of the propeller spinner 10 or that adjacent outer surface of the portion 40. However, such a substantial gap at the aft inner end portion 44 of the cuff 20 does not introduce material drag such as would occur if such a gap existed between the forward lower leading edge 34 and the adjacent surface of the spherical portion 28 or the surface of the sloping portion 30.

It will be appreciated that the combination of the propeller blade 18 and the associated attached propeller cuff 20 can be replaced by a suitable propeller blade which has an integral inner portion which has substantially the same aerodynamic close section as the propeller cuff 20. In such a case the need for a cuff 20 would be eliminated. Consequently, the reference to a propeller cuff 20 is also meant to include a similar shaped root end blade portion with a similar airfoil section.

Although the invention has been described in considerable detail with reference to a preferred embodiment, it will be understood and appreciated that variations may be made within the spirit and scope of the invention as defined in the appended claims.

What is claimed is:

1. Propeller apparatus comprising a propeller spinner having a plurality of spaced protruding surfaces attached to and extending radially outward from the exterior surface of said spinner and an exterior substantially continuous surface except for said protruding surfaces that lacks any substantial depressions, a plurality of variable pitch propeller blades extending radially outward from said spinner through the protruding surfaces of said spinner, said propeller blades each having a long central axis and having a root end portion located outside the exterior surface of said spinner adjacent to the protruding surfaces of said spinner, said root end portion comprising a propeller cuff or a blade portion with an airfoil section, and means located on the root end portion adjacent to the protruding surface of said spinner and on the protruding surface of said spinner for reducing drag between said root end portion and the protruding surface of said spinner while the pitch of said variable pitch propeller blades is varied through at least a portion of the forward operational pitch range of said propeller blades comprising means for eliminating any substantial gap between at least a portion of the protruding surface of said spinner, said gap eliminating means comprising a portion of the protruding surface being curved in three dimensions to form substantially a portion of a sphere with a radius which pivots about a point on the centerline of the central long axis of the propeller blade having a portion thereof located adjacent to the substantially continuous exterior surface of said propeller spinner and the exterior surface of a portion of the root end portion being curved to substantially match the curvature of the adjacent substantially spherical shaped portion of the protruding surface, wherein said protruding surface has a forward sloping portion and the forward portion of the spherical portion terminates at a juncture where the forward portion of the spherical portion intersects the forward sloping portion.

2. The propeller apparatus of claim 1 wherein the forward sloping portion has a vertical cross section that slopes forward and is straight.

3. The propeller apparatus of claim 1 wherein the protrusion has a radiused portion located at the forward lower edge of the forward sloping portion.

4. The propeller apparatus of claim 3 wherein the same radius for the radiused portion located at the lower edge of the forward sloping portion is maintained for substantially 45° on each side of the centerline of said protrusion when the vertex of the 45° angle is located substantially on the centerline of the long axis of said propeller blade.

5. The propeller apparatus of claim 1 wherein the root end portion of said variable pitch propeller blades comprising a propeller cuff or a blade portion with an airfoil section has a lower leading edge and the lower leading edge does not extend forward of the juncture where the forward portion of the spherical portion intersects the forward sloping portion.

6. The propeller apparatus of claim 5 wherein the exterior surface of the forward portion of the portion of the root end portion of said propeller blade that is curved to substantially match the curvature of the adjacent substantially spherical shaped portion of the protruding surface terminates substantially at the lower leading edge of said propeller cuff or blade portion with an airfoil section.

7. The propeller apparatus of claim 6 wherein the lower leading edge of the propeller cuff or blade portion terminates substantially at the juncture where the forward portion of the spherical portion intersects the forward sloping portion of said protrusion when the propeller cuff or blade portion is at its most forward position.

* * * * *